United States Patent [19]

Boksberger et al.

[11] Patent Number: 4,860,160
[45] Date of Patent: Aug. 22, 1989

[54] ADJUSTABLE VACUUM CONDENSER

[75] Inventors: Hans-Ulrich Boksberger, Oberbözberg; Juraj Tomljenovic, Tegerfelden, both of Switzerland

[73] Assignee: BBC Brown Boveri AG, Baden, Switzerland

[21] Appl. No.: 231,961

[22] Filed: Aug. 15, 1988

[51] Int. Cl.$^4$ .............................................. H01G 5/02
[52] U.S. Cl. ................................................... 361/279
[58] Field of Search ............... 361/279, 326, 295, 296, 361/297

[56] References Cited

U.S. PATENT DOCUMENTS

| Re. 27,900 | 1/1974 | Oeschger . |
| 2,889,501 | 6/1959 | Wilkens et al. . |
| 2,920,255 | 1/1960 | Luft . |
| 3,040,220 | 6/1962 | Neibaur . |
| 3,270,259 | 8/1966 | Oeschger . |
| 3,366,852 | 1/1968 | Goetzl . |

FOREIGN PATENT DOCUMENTS

| 1764318 | 7/1971 | Fed. Rep. of Germany . |
| 2259351 | 4/1974 | Fed. Rep. of Germany . |
| 1074011 | 9/1954 | France . |
| 1449270 | 7/1966 | France . |
| 656740 | 7/1986 | Switzerland . |

Primary Examiner—John A. Griffin
Attorney, Agent, or Firm—Oblon, Spivak, McClelland, Maier & Neustadt

[57] ABSTRACT

In an adjustable vacuum condenser, in which two inter-engaging electrode systems are arranged in a vacuum-tight housing, the upper electrode system of which is displaceably connected with the cover of the housing via a set of bellows serving as current feed, the interfering self-inductivity is reduced by adapting the outside diameter of the set of bellows and the inside diameter of the electrically conducting jacket surrounding the set of bellows to one another.

2 Claims, 2 Drawing Sheets

ADJUSTABLE VACUUM CONDENSER

BACKGROUND OF THE INVENTION

1. Field of the Invention

The invention relates to the field of high-frequency technology. It relates particularly to an adjustable vacuum condenser, especially for high capacities, comprising a cylindrical housing of an insulating jacket, an upper metal jacket connected to the insulating jacket at its top end, a lower metal jacket connected to the insulating jacket at its bottom end, a cover closing the upper metal jacket, and a base part closing the lower metal jacket;

in the housing two inter-engaging electrode systems, the lower electrode system of which is fixed to the base part and the upper electrode system is arranged displaceably in the direction of the housing axis by means of an actuating rod running through an opening in the cover;

at least one set of bellows (2) which concentrically surrounds the actuating rod (1), connects the cover with the upper electrode system and serves as current feed for the upper electrode system; and an electrically conducting jacket, which concentrically surrounds the set of bellows and conducts on its inner face the high-frequency operating currents to the set of bellows via the cover.

DISCUSSION OF BACKGROUND

Adjustable vacuum condensers of the type mentioned at the beginning, as are known, for example, from U.S. Pat. Specification No. 3,270,259 or Swiss Patent Specification No. 656,740, have been used for a long time as tuning elements in high-frequency applications of high capacity (for example, in broadcasting transmitters etc.).

In the case of these known vacuum condensers, two electrode systems inter-engaging in an interleaved manner are accommodated in an evacuated housing in the form of concentrically arranged metal cylinders. The lower one of the electrode systems is fixedly mounted on the base part of the housing. The upper electrode system is fixed displaceably in vertical direction at the bottom end of an actuating rod which leads to the outside via an opening in the housing cover.

The opening in the housing cover is sealed by a set of bellows, which concentrically surrounds the actuating rod and is connected in a vacuum-tight manner both with the housing cover and with the upper electrode system.

In order to provide electrical insulation of the two electrode systems, the middle part of the housing consists of an insulating jacket. This insulating jacket is customarily made of glass or a ceramic material.

In the most simple embodiments of the known vacuum condensers (cf. Swiss Patent Specification 656,740), the set of sealing bellows serves at the same time as current feed for the upper electrode system.

However, the following problems are inherent in these embodiments (cf., for example, German Auslegeschrift 1,764,318):

On the one hand, the diameter of the set of bellows should be as small as possible, in order to keep the force coming from the atmospheric pressure and exerting its effect on the upper electrode system and thus on the adjusting mechanism, as low as possible.

On the other hand, the diameter of the set of bellows should be as large as possible, because the wire crosssection increases with the diameter of the set of bellows, so that higher operating currents can be tolerated.

In order to avoid this predicament, in the case of the solution known from Swiss Patent Specification 656,740, although the diameter of the set of bellows is kept very small, the set of bellows is duct-cooled.

In another possible solution (German Patent Specification 2,259,315), apart from a set of sealing bellows having a small diameter, a current-bearing second set of bellows with a large diameter is provided, which, being completely under vacuum, concentrically surrounds the set of sealing bellows. However, since this second set of bellows is surrounded by a vacuum from all sides, it is no longer possible to provide the duct cooling necessary for high capacities, so that in the case of this construction the upper limit of capacity is soon reached.

Another problem, which is related to the diameter of the current-bearing set of bellows, has up till now not been acknowledged at all, namely the problem concerning self-inductivity of the vacuum condenser.

The self-inductivity leads to an increase of tension between the electrode systems (condenser plates), said increase being dependent on the operating frequency. Thus, great self-inductivities have a considerable negative effect on the operating reliability of the vacuum condensers, so that a decrease of self-inductivity is desirable.

As is illustrated in FIG. 1 of German Auslegeschrift 1,764,318, in the case of a vacuum condenser of the known type, the high-frequency operating current flows during operation from the upper outside face via the outer and the inner sides of an electrically conducting jacket, the bottom side of the cover and the outside of the current-bearing set of bellows to the upper electrode system.

It was found that this specific type of current path plays a decisive role in determining the self-inductivity inherent in the vacuum condenser, so that a reduction of the self-inductivity can be achieved above all by measures within the region of the set of bellows.

SUMMARY OF THE INVENTION

Accordingly, one object of this invention is to provide a novel adjustable vacuum condenser having a clearly reduced self-inductivity and thus an improved operational performance.

In the case of a vacuum condenser of the type mentioned at the beginning, the object is achieved by adapting the outside diameter of the set of bellows and the inside diameter of the electrically conducting jacket to one another in order to reduce the self-inductivity of the vacuum condenser.

The essence of the invention consists in choosing a diameter ratio of the coaxial arrangement of the current-bearing set of bellows and electrically conducting jacket, which is as close to 1 as possible, because such a diameter ratio stands in logarithmic relationship to the self-inductivity in the region of the set of bellows.

In a preferred embodiment of the invention, the ratio of the inside diameter of the electrically conducting jacket and the outside diameter of the set of bellows is smaller than or equal to 1.5, preferably smaller than or equal to 1.2.

Exemplary embodiments of the invention are evident from the subclaims.

BRIEF DESCRIPTION OF THE DRAWINGS

A more complete appreciation of the invention and many of the attendant advantages thereof will be readily obtained as the same becomes better understood by reference of the following detailed description when considered in connection with the accompanying drawings, wherein.

DESCRIPTION OF THE PREFERRED EMBODIMENTS

Figure 1:
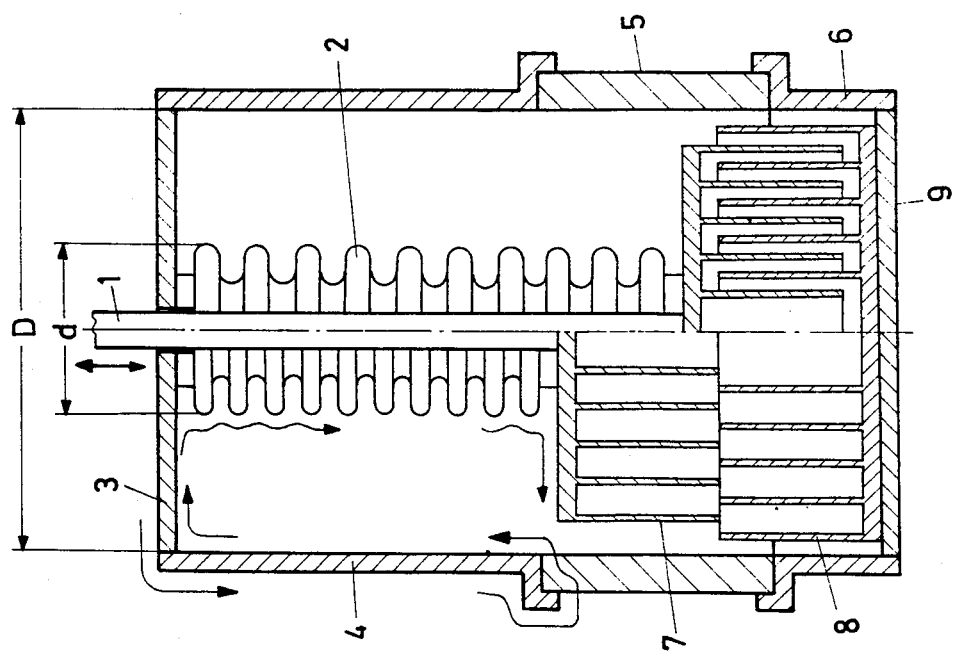
FIG. 1 shows the simplified section view of an adjustable vacuum condenser according to the prior art.

Referring now to the drawings, wherein like reference numerals designate identical or corresponding parts throughout the several views, in FIG. 1 the principle construction of an adjustable vacuum condenser according to the prior art is illustrated in a simplified section view. The left half of the figure in this case shows the configuration of the condenser at minimal capacity and the right half correspondingly shows the configuration at maximum capacity. An analogous division also applies to the remaining FIGS. 2–4.

The vacuum condenser of FIG. 1 comprises a vacuum-tight housing, which comprises a cylindrical insulating jacket 5 of glass or ceramic material, an upper metal jacket 4 connected to the insulating jacket 5 at its top end, said upper metal jacket 4 being closed at its top end with a cover 3, and a lower metal jacket 6 connected to the insulating jacket 5 at its bottom end, said metal jacket 6 being closed at its bottom end by a base part 9. The upper and lower metal jackets 4 and 6 are likewise cylindrical and customarily have about the same diameter as the insulating jacket 5.

In the inside of the housing, an upper electrode system 7 and a lower electrode system 8 are arranged, which together form the adjustable capacity. In most cases, the two electrode systems have the form of annular, concentric, inter-engaging plate sets.

The lower electrode system 8 is fixedly mounted on the base part 9. The upper electrode system 7 is displaceable in direction of the housing axis. A displacement, and thus a change in capacity, is effected by means of an actuating rod 1, which is moved via a spindle mechanism (not shown).

The actuating rod 1 leads to the spindle mechanism located on the outside via an opening in the cover 3. In order to achieve vacuum-tightness despite this opening in the cover 3, a set of bellows 2 which is extensible in longitudinal direction is provided, which concentrically surrounds the actuating rod 1 and which ends at the top end with the cover 3 and at the bottom end with the upper electrode system 7.

In the simple embodiment according to FIG. 1, the set of bellows 2 serves not only as a sealing element, but also as current feed for the upper electrode system 7. The high-frequency operating current flows from one connection region on the outside of the cover 3 in direction of the arrows, which are shown on the left of FIG. 1, via the outside of the upper metal jacket 4, the inside of the upper metal jacket 4, the inside of the cover 3 and the outside of the set of bellows 2 to the upper electrode system 7.

The upper metal jacket 4 represents an electrically conducting jacket, which concentrically surrounds the current-bearing set of bellows 2 and together with this forms a coax line. In the same manner, also the other sections of the vacuum condenser can be understood as parts of a coax line.

In order to evaluate the self-inductivity of the illustrated vacuum condenser, in a first approximation, the inductance per unit length can be calculated with the aid of known equations from the theory of the coax lines:

$$Z = 60 \times \ln(D/d) \ [\text{Ohm}]; \quad (1)$$

$$L = 2 \ln(D/d) = Z/30 \ [\text{nH/cm}], \quad (2)$$

with the wave resistance Z, the inductance per unit length L, the internal conductor diameter d and the external conductor diameter D.

In the case of the part of the coax line from the set of bellows 2 and the upper metal jacket 4 acting as electrically conducting jacket, the outside diameter of the set of bellows 2 corresponds, as shown in FIG. 1, to the interior conductor diameter d, and the inside diameter of the electrically conducting jacket (upper metal jacket 4) corresponds to the exterior conductor diameter D.

In the case of an exemplary vacuum condenser of the type shown in FIG. 1 with the assumed values of d=75 mm, D=187 mm, the length of the upper metal jacket 4 =107 mm and comparable dimensions in the bottom region of the condenser, with the aid of the equations (1) and (2) an overall self-inductivity of about 42 nH can be calculated. In this case it is assumed that the vacuum condenser is in the position of maximum capacity (right hand-side of FIG. 1) and that in the region of the insulating jacket 5, the exterior conductor that is still lacking in the coax line is arranged right on the outside face of the insulating jacket 5.

Of these 42 nH as much as 19.5 nH are to be found in the region of the set of bellows from the cover 3 to the insulating jacket 5, and 12 nH in the region of the set of bellows inside the insulating jacket 5.

From such approximate calculations it easily becomes evident that far more than half of the overall self-inductivity of the illustrated vacuum condenser is contributed by the region of the set of bellows alone. An effective reduction of self-inductivity can therefore only be achieved by way of constructive changes in the region of the set of bellows.

Since according to the equations (1) and (2) the inductance per unit length is in logarithmic dependence on the diameter ratio D/d of the part of the coax line, i.e. in the case of the vacuum condenser, on the ratio between the outside diameter of the current-bearing set of bellows 2 and the inside diameter of the electrically conducting jacket (upper metal jacket 4), a reduction of the diameter ratio leads to a corresponding reduction of self-inductivity.

In the case of the present invention, this is achieved by adapting the outside diameter of the set of bellows 2 and the inside diameter of the electrically conducting jacket with one another.

Preferably, the said diameter ratio is selected to be smaller than or equal to 1.5, in particular smaller than or equal to 1.2. Such a favorable diameter ratio is, for example, achieved if in the abovementioned case where it was assumed that D=187 mm, the outside diameter of the set of bellows 2 is extended to d=167 mm, i.e. if the distance between the set of bellows 2 and the electrically conducting jacket is only about 10 mm.

Such an extension of the diameter of the set of bellows then reduces the share of self-inductivity in the region of the set of bellows between the cover 3 and the insulating jacket 5 from the abovementioned 19.5 nH to just 2.4 nH.

Figure 2:
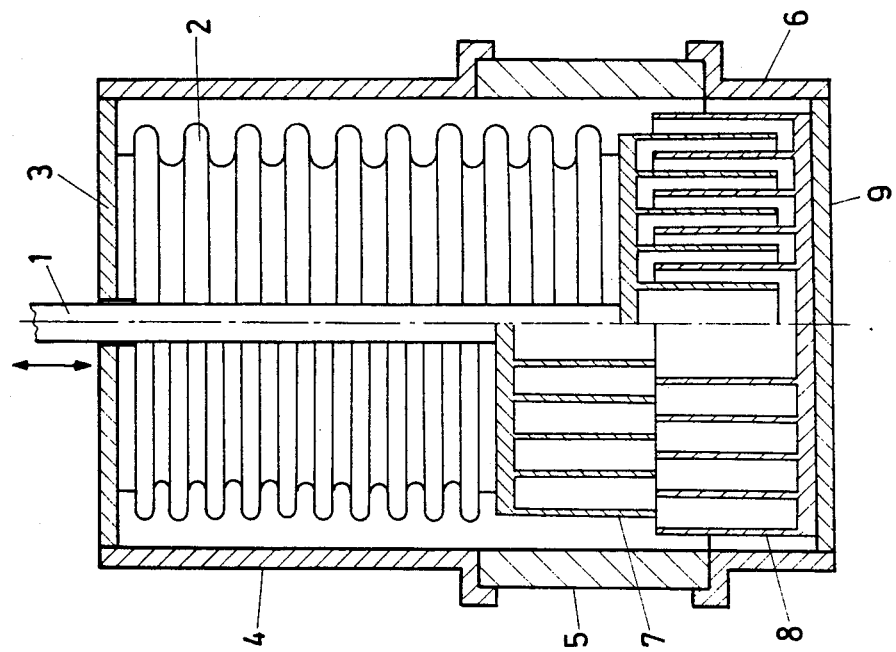
FIG. 2 shows a corresponding view of a vacuum condenser according to a first exemplary embodiment of the invention.

The adaptation of the diameters of the set of bellows and the electrically conducting jacket can now be realized in different ways (FIG. 2-4):

In the case of the exemplary embodiment illustrated in FIG. 2, the housing of the vacuum condenser is left in its original form; in particular, the diameter of the upper metal jacket 4 is about the same as the diameter of the insulating jacket 5. The adaptation is here carried out by matching the outside diameter of the set of bellows 2 to the inside diameter of the upper metal jacket 4 (which here represents the electrically conducting jacket).

This embodiment of the invention has the advantage that its exterior geometry of the vacuum condenser and thus its installing conditions are not changed. Moreover, the increase in diameter of the set of bellows effects a reduction in the self-inductivity not only in the region of the upper metal jacket 4, but also in the region of the insulating jacket 5. On the other hand, the strongly increased diameter of the set of bellows creates the operating problems already mentioned at the beginning, because due to the large area of crosssection the atmosphere presses with great force onto the upper electrode system 7.

Figure 3:
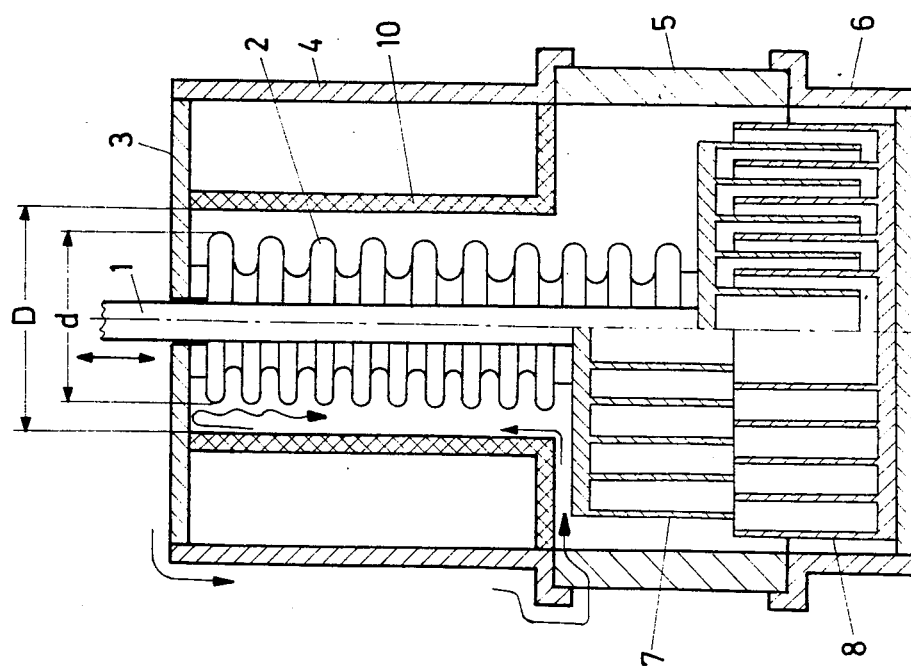
FIG. 3 shows a corresponding view of a second exemplary embodiment of the invention.

In the case of the exemplary embodiment shown in FIG. 3, the basis is a set of bellows 2 having the known small diameter. Here, adaptation is achieved by virtue of inserting an additional inner metal jacket 10 into the housing in the region of the upper metal jacket 4, which inner metal jacket 10 now, instead of the upper metal jacket 4, acts as electrically conducting jacket, and its inside diameter is close to the diameter of the set of bellows. In this configuration, the path of the high-frequency operation current, which is marked with arrows in the left half of FIG. 3, is changed.

This embodiment of the invention likewise has the advantage that the exterior geometry of the vacuum condenser does not have to be changed. Moreover, the operation problem occurring when the diameter of the set of bellows is increased is avoided.

Figure 4:
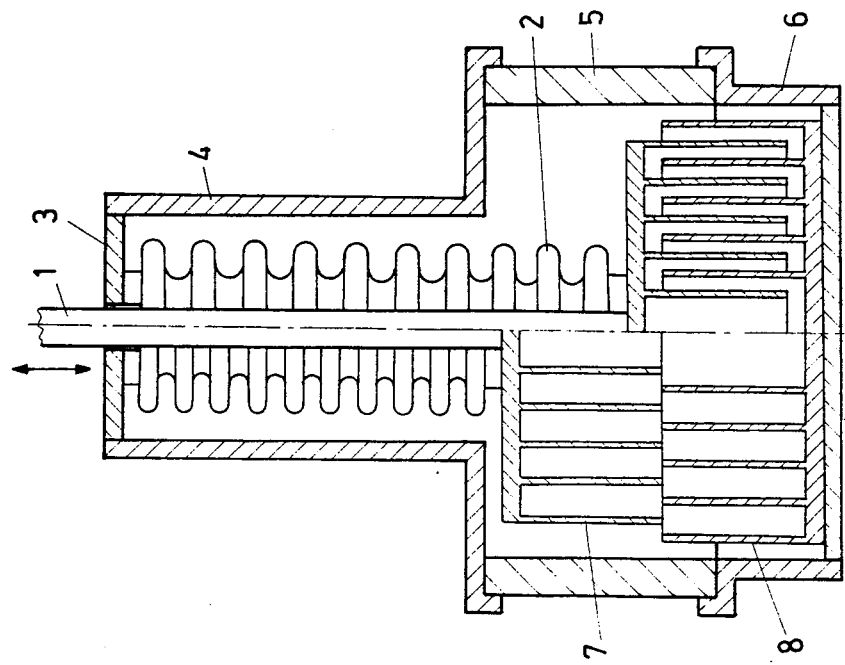
FIG. 4 shows a corresponding view of a third exemplary embodiment of the invention.

Finally, in the case of the exemplary embodiment reproduced in FIG. 4, the basis is, just as in FIG. 3, a set of bellows 2 having a small diameter. The adaptation of the inside diameter of the electrically conducting jacket is in this case, however, not achieved by inserting an inner metal jacket, but directly by virtue of a corresponding design of the upper metal jacket 4, which, starting from the large diameter of the insulating jacket 5, extends to a region which tightly encompasses the set of bellows 2.

In this case, the advantage lies in an especially simple type of construction, while the exterior geometry of the vacuum condenser has to be changed.

It is true that in the case of the exemplary embodiments according to FIG. 3 and 4, in contrast to the exemplary embodiment according to FIG. 2, a reduction in the self-inductivity in the region of the upper metal jacket 4 is obtained, but this is not the case in the region of the insulating jacket 5, because there the original diameter ratio is retained.

Explanation of the invention has always been based on the fact that the set of bellows is current-bearing and at the same time also a sealing element. The invention is, however, not limited to this simple case, but it can also be used in such cases where the set of sealing bellows and the current-bearing set of bellows are different from each other (cf., for example, German Pat. Specification No. 2,259,351) or where several sets of bellows take over both functions (cf., for example, U.S. Pat. Specification No. 3,270,259).

Further, it is to be noted that, especially in the case of vacuum condensers with ducted cooling of the current-bearing set of bellows where, for reasons of easy operability, the diameters of the sets of bellows must be kept small, the embodiments according to FIGS. 3 and 4 are of particular interest, because in these cases, on the sides of the set of bellows no changes have to be carried out.

Summarizing, the invention provides an adjustable vacuum condenser, which has an improved operating reliability due to a clearly reduced self-inductivity and which has been developed from the known vacuum condensers by comparatively simple modifications.

Obviously, numerous modifications and variations of the present invention are possible in the light of the above teachings. It is therefore to be understood that within the scope of the appended claims, the invention may be practiced otherwise than as specifically described herein.

What is claimed as new and desired to be secured by Letters Patent of the United States is:

1. An adjustable vacuum condenser, especially for high capacities, comprising:
   (a) a cylindrical housing of an insulating jacket, an upper metal jacket connected to the insulating jacket at its top end, a lower metal jacket connected to the insulating jacket at its bottom end, a cover closing the upper metal jacket, and a base part closing the lower metal jacket;
   (b) in the housing; two inter-engaging electrode systems comprising a lower electrode system and an upper electrode system, the lower electrode system of which is fixed to the base part, and the upper electrode system is arranged displaceably in a direction of the housing axis by means of an actuating rod running through an opening in the cover;
   (c) at least one set of bellows which concentrically surrounds the actuating rod, connects the cover with the upper electrode system and serves as current feed for the upper electrode system;
   (d) an electrically conducting jacket, which concentrically surrounds the set of bellows and conducts on its inner face the high-frequency operating currents to the set of bellows via the cover;
wherein:
   (e) an outside of diameter of the set of bellows and an inside diameter of the electrically conducting jacket are adapted to one another in order to reduce the self-inductivity of the vacuum condenser;
   (f) the ratio of the inside diameter of the electrically conducting jacket and the outside diameter of the set of bellows is smaller than or equal to 1.5;
   (g) the upper metal jacket has a diameter, which is essentially the same as a diameter of the insulating jacket;

(h) inside the upper metal jacket there is arranged an inner metal jacket which concentrically surrounds the set of bellows;

(i) the inner metal jacket forms the electrically conducting jacket; and (j) the inside diameter of the electrically conducting metal jacket is adapted to the set of bellows.

2. The vacuum condenser as claimed in claim 1, wherein the set of bellows is duct-cooled.

* * * * *